US012129816B2

(12) United States Patent
Nelle et al.

(10) Patent No.: US 12,129,816 B2
(45) Date of Patent: Oct. 29, 2024

(54) COMPRESSION EMISSIONS EVACUATOR

(71) Applicant: Estis Compression, LLC, Kilgore, TX (US)

(72) Inventors: Will A. Nelle, San Angelo, TX (US); Chris Lindsey, Carthage, TX (US)

(73) Assignee: Estis Compression, LLC, Kilgore, TX (US)

( * ) Notice: Subject to any disclaimer, the term of this patent is extended or adjusted under 35 U.S.C. 154(b) by 0 days.

(21) Appl. No.: 18/543,321

(22) Filed: Dec. 18, 2023

(65) Prior Publication Data

US 2024/0117783 A1 Apr. 11, 2024

Related U.S. Application Data

(63) Continuation-in-part of application No. 17/942,837, filed on Sep. 12, 2022, now Pat. No. 11,976,616.

(51) Int. Cl.

| | |
|---|---|
| ***F02M 21/02*** | (2006.01) |
| ***F02B 43/10*** | (2006.01) |
| ***F02M 31/14*** | (2006.01) |
| ***F02M 35/10*** | (2006.01) |

(52) U.S. Cl.
CPC ......... *F02M 21/0227* (2013.01); *F02B 43/10* (2013.01); *F02M 21/0221* (2013.01); *F02M 21/0242* (2013.01); *F02M 21/0245* (2013.01); *F02M 31/14* (2013.01); *F02M 35/10216* (2013.01); *F02B 2043/103* (2013.01)

(58) Field of Classification Search
CPC ........... F02M 21/0227; F02M 21/0221; F02M 35/10216; F02M 21/0245; F02M 31/14; F02M 21/0242; F02M 25/00; F02M 26/00; F02B 2043/103; F02B 63/06; F02B 43/10
See application file for complete search history.

(56) References Cited

U.S. PATENT DOCUMENTS

| | | | | |
|---|---|---|---|---|
| 5,499,616 A | | 3/1996 | Enright | |
| 5,878,731 A | * | 3/1999 | Bedkowski ............ | F01M 13/04 123/573 |
| 5,947,697 A | | 9/1999 | Morrison | |
| 9,243,527 B2 | | 1/2016 | Bidner | |
| 2006/0213370 A1 | | 9/2006 | Leonard | |
| 2008/0127950 A1 | | 6/2008 | Malm | |
| 2011/0094593 A1 | | 4/2011 | Malm | |
| 2015/0019107 A1 | * | 1/2015 | Whitehead ............. | F02D 41/04 701/102 |

(Continued)

OTHER PUBLICATIONS

International Search Report and Written Opinion issued in App. No. PCT/US23/70215, mailing date Nov. 3, 2023, 10 pages.

*Primary Examiner* — Phutthiwat Wongwian
*Assistant Examiner* — Diem T Tran
(74) *Attorney, Agent, or Firm* — FisherBroyles, LLP; Jason P. Mueller

(57) ABSTRACT

An emissions evacuator system that collects natural gas vented from various components of a natural gas compressor system and directs the vented gases to the intake system of a natural gas engine of the compressor system. The evacuator system utilizes vacuum from an intake system of the natural gas engine contained on compressor packages to “suck up” the gaseous emissions from various emission sources on the compressor package. These emissions are rendered inert when combusted in the natural gas engine.

20 Claims, 11 Drawing Sheets

(56) References Cited

U.S. PATENT DOCUMENTS

| | | | | |
|---|---|---|---|---|
| 2016/0010614 | A1* | 1/2016 | Pursifull | F02D 37/02 60/277 |
| 2016/0040688 | A1 | 2/2016 | Fletcher | |
| 2016/0201552 | A1 | 7/2016 | Fletcher | |
| 2018/0003342 | A1 | 1/2018 | Kunkel | |
| 2021/0054837 | A1 | 2/2021 | Robbins | |
| 2021/0270157 | A1 | 9/2021 | Osada | |
| 2022/0170485 | A1 | 6/2022 | Ellis, Jr. | |
| 2023/0134352 | A1 | 5/2023 | Castagnos | |

* cited by examiner

COMPRESSION EMISSIONS EVACUATOR

CROSS REFERENCE

This application is a continuation-in-part of U.S. patent application Ser. No. 17/942,837 having a filing date of Sep. 12, 2022, the disclosures of which are incorporated herein by reference in their entireties.

BRIEF DESCRIPTION OF THE DRAWINGS

The accompanying drawings form a part of this disclosure and are incorporated into the specification. The drawings illustrate example embodiments of the disclosure and, in conjunction with the description and claims, serve to explain various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein.

FIG. 4A shows a side elevational view of a compressor skid unit with an emissions evacuator system in another embodiment.

DETAILED DESCRIPTION

Figure 1:
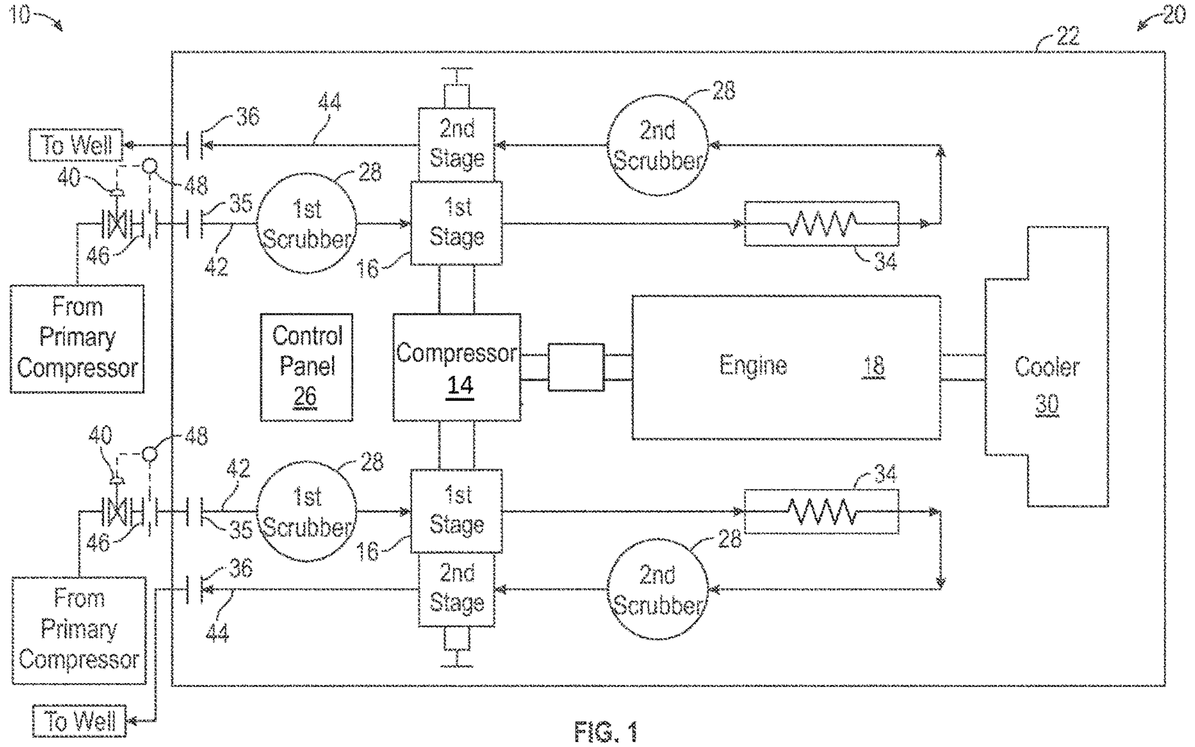
FIG. 1 shows a schematic diagram of a compressor skid unit in an embodiment.

The systems, methods, and devices of the present disclosure each have several aspects, no single one of which is solely responsible for its desirable attributes. Without limiting the scope of this disclosure as expressed by the claims that follow, some features will now be discussed briefly. After considering this discussion, and particularly after reading this section, one will understand how the features of this disclosure provide advantages that include reduced venting of greenhouse gases (GHG) from natural gas compressor packages.

Natural gas typically contains, in percent by volume, about 70% to nearly 100% methane, about 0-20% propane, and smaller amounts of ethane, butane, carbon dioxide, oxygen, nitrogen and hydrogen sulfide. Methane is the primary component. Natural gas is considered "dry" when it contains almost pure methane, having had most of the other components removed. Natural gas is referred to as "wet" when the other hydrocarbons are still present. Methane is considered a greenhouse gas that potentially harms the environment. According to the United Nations Economic Commission for Europe, methane in the air can, on a parts per volume basis, warm that air at a rate of 84 times that of carbon dioxide. It is therefore desirable to minimize the amount of natural gas vented into the atmosphere.

Natural gas compressors are in widespread use in the oil and gas industry. Tens of thousands of compressors are in existence in the United States alone. Such compressors are used in conjunction with pipelines to move natural gas over short or long distances. Additionally, such compressors are used in high pressure gas lift (HPGL) operations where high pressure gas is injected into production wells. Many of these compressor packages operate continuously (24/7/365). Natural gas compressor packages are typically powered by a natural gas fired internal combustion reciprocating engine, which commonly drives a reciprocating compressor. Auxiliary to these two components, the compressor package typically also contains two-phase separators, known to the industry as "scrubbers". The natural gas compressor package may include various other components (e.g., actuators, control valves, etc.). Due to the availability of high-pressure gas (e.g., compressed natural gas) many of the components of natural gas compressor packages are pneumatically operated using compressed natural gas.

Each of the components on a compressor package have inherent leaks of gaseous methane and non-methane hydrocarbon emissions. For instance, blow-by between cylinders and crankcases is present in the natural gas engine and compressor. The scrubbers and other pneumatic devices typically vent compressed gas during or after operation. Industry practice has been to simply allow these emissions to vent into the atmosphere. Though this practice has historically been extremely commonplace, concerns over global warming from greenhouse gases has created the desire and need to reduce greenhouse gas emissions. These greenhouse gas emissions from engine and compressor crankcases, as well as other compressor package pneumatic devices are no exception.

This disclosure generally relates to emission evacuation systems and methods for use with natural gas compressor packages. More specifically, the systems and methods collect methane and non-methane greenhouse gas emissions (e.g., volatile emissions) from natural gas engine crankcases, natural gas compressor crankcases and/or pneumatic devices (e.g., natural gas operated scrubbers, actuators etc.) that are routinely vented to the atmosphere by natural gas compressor packages. The collected gases are routed to the natural gas engine and burned as fuel gas and converted into useful work. In doing so, volatile emissions are no longer released into the environment, but neutralized and released into the environment as inert gases.

Figure 2:
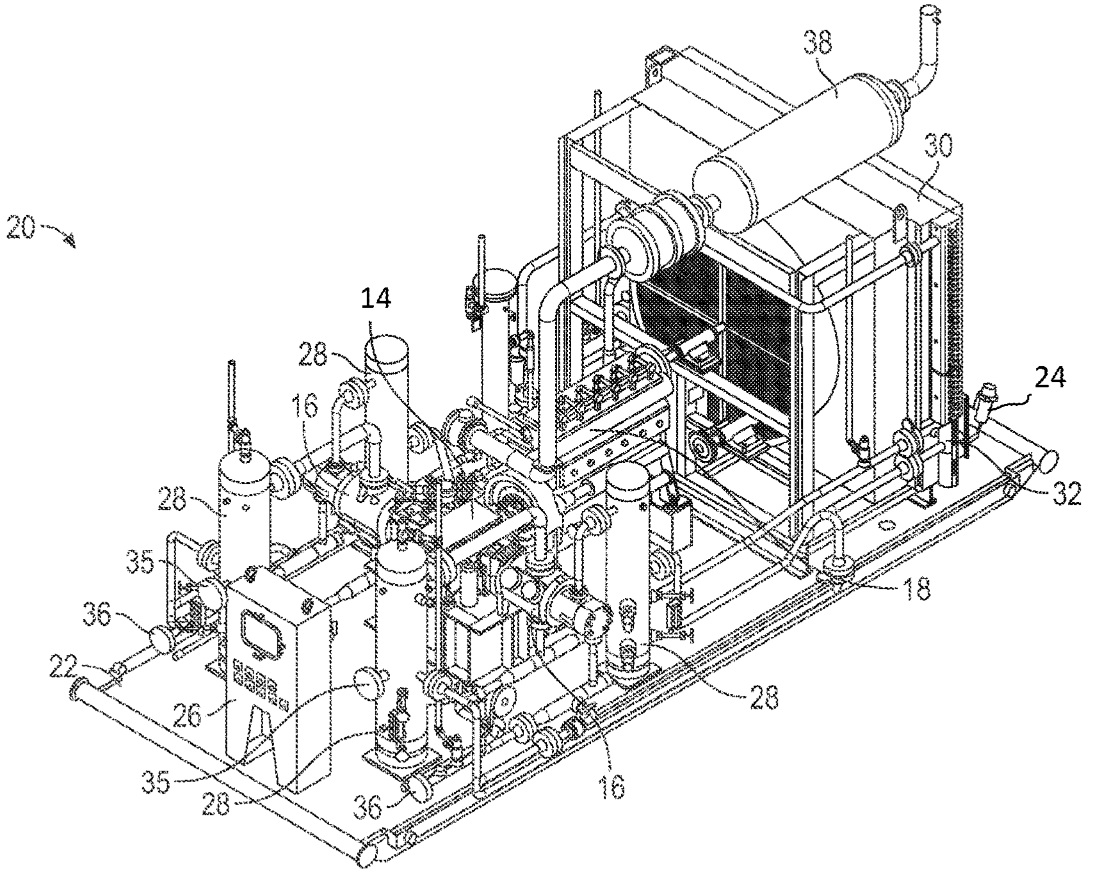
FIG. 2 shows a perspective view of a compressor skid unit in in an embodiment.
Figure 3:
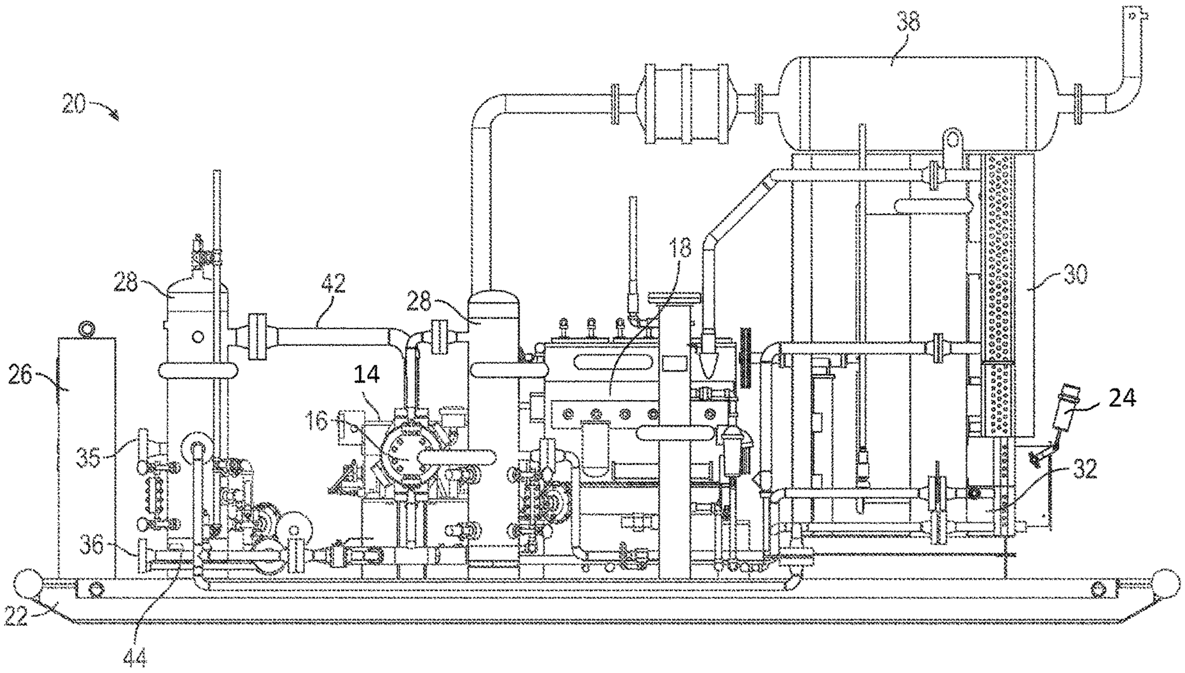
FIG. 3 shows a side elevational view of a compressor skid unit in an embodiment.

FIG. 1-3 illustrate a natural gas compressor package, in an embodiment. In this illustrated embodiment, the natural gas compressor package is a self-contained or skid mounted system allowing the system to be portable. In such an embodiment, the emission controls system disclosed herein may be an entirely on-skid system requiring no off-skid infrastructure. Though discussed in relation to an on-skid embodiment utilized for high pressure gas injection into wells, it will be expressly understood that aspects of the present disclosure may be utilized with off-skid systems as well as other compressor systems (e.g., pipeline compressor systems). The on-skid gas injection system is provided by way of example and not by way of limitation. FIG. 1 shows a schematic diagram of a compressor skid, in an embodiment. FIGS. 2 and 3 illustrate the exemplary compressor skid in greater detail. In each of these figures, the compressor system includes an illustrative two throw reciprocating compressor, which may be used to provide gas lift to two wells. However, this is not a requirement.

As shown in FIG. 1, the natural gas compressor package or "compressor system" 10 includes a compressor 14 having a plurality of compressor cylinders 16. A compressor engine 18 is operably coupled to the compressor 14 and configured to simultaneously drive each of the compressor cylinders 16. Thus, the system may utilize a single engine 18 (e.g., natural gas engine) to operate all of the compressor cylinders 16. As used herein, a "compressor cylinder" refers to a cylinder having a piston disposed therein to compress and displace gas within the cylinder, wherein the piston is driven by a rotating crankshaft coupled to the compressor engine 18. Thus, the compressor engine 18 is operably coupled to each of the compressor cylinders 16 and configured to simultaneously drive each of the compressor cylinders 16 by driving the crankshaft disposed in a crankcase, which drives each piston contained within each cylinder in the plurality of compressor cylinders 16. Each compressor cylinder 16 has a gas inlet line 42 and its own dedicated gas outlet line 44, which may supply compressed gas to, for example, a well. Thus, in an exemplary embodiment, a single compressor skid 20 may provide wellbore injection gas one or more individual wells.

To independently control the gas flow rate to each well, the compressor system 10 may further comprise one or more control valves 40 each corresponding to a respective compressor cylinder 16. Each control valve 40 may be positioned on a gas inlet line 42 upstream of a compressor cylinder 16, as best seen in FIG. 1. Each control valve 40 is configured to independently control the suction pressure to each respective compressor cylinder 16 and thereby to independently control a gas flow rate through the gas outlet line 44 of each compressor cylinder 16. These valves 40 are, in an embodiment, pneumatically controlled by a controller 48, which opens and closes the valves using compressed natural gas. Thus, the valves/controller are pneumatic devices. To control the gas flow rate through each of the gas outlet lines 44, the system 10 may include flow meters 46 and/or the controllers 48 each corresponding to one of the control valves 40.

In an embodiment, each compressor cylinder 16 includes a first compression stage and a second compression stage. The gas in the inlet gas line 42 is compressed in the first stage and then passes through a cooler 34 before being further compressed to its final discharge pressure in the second stage. The compressor skid 20 shown in FIG. 1 illustrates separate coolers 34 for each gas stream and a cooler 30 for the compressor engine 18. In an alternative embodiment, as shown in FIGS. 2 and 3, a common cooler structure 30 may be utilized to cool compressed gas streams from all of the separate cylinders 16, as well as to provide cooling water to the compressor engine 18. The cooling structure 30 may include separate cooling sections 32 designated for the compressed gas process streams. The skid 20 may also include a compressor exhaust 38 for the engine 18. The cooler 30 may define a radiator. A pneumatic actuator 24 may control airflow through the cooler (e.g., by controlling louvers of an air flow path of the cooler; not shown).

In an embodiment, the compressor skid 20 comprises a plurality of scrubbers 28 each corresponding to a respective compressor cylinder 16. The scrubbers 28 are configured to remove liquid droplets, which may include a variety of liquid hydrocarbons that may condense out of the gas stream. In an embodiment, as shown in FIG. 1, each compressor cylinder 16 has two scrubbers 28, one upstream of the first stage compressor and one upstream of the second stage compressor and downstream of the cooler 34. In other embodiments three scrubbers may be utilized.

As shown in FIGS. 2 and 3, components of the compressor system 10 share a common skid unit frame 22 to which the components may be mounted to provide a portable skid-mounted compressor unit 20 that can be transported to any field location. As used herein, a "skid" refers to a compressor system having components mounted onto a frame 22 so that the system may be transported as a single unit 20. In addition, the skid is sized to that the unit may be transported by cargo truck or rail as a single unit to any location as needed. The compressor 14 and the compressor engine 18 are mounted directly onto the skid unit frame 22. In addition, a control panel 26, scrubbers 28, and coolers 34, which may be incorporated into a single cooling structure 30, along with associated piping, may also be mounted directly onto the skid unit frame 22.

As best seen in FIG. 2, the portable compressor skid 20 may have a gas inlet line flange 35 and a gas outlet line flange 36 for connecting the gas inlet lines 42 and the gas outlet lines 44, respectively, to the compressor skid 20 after the skid has been transported to its location for intended use. In this embodiment, the process control equipment is thus "off-skid" and is installed after the skid 20 is put into place. In an optional embodiment, the skid 20 may include the control valves 40, flow meters 46, and controllers 48 "on-skid" for easier installation. In this embodiment, the control valves 40, flow meters 46, and controllers 48, and associated piping may additionally be mounted onto to the skid unit 20 so that later installation of these components is not required.

As noted above, the various components of the compressor system 10 tend to leak or vent natural gas to the atmosphere. For instance, natural gas blow-by between the igniting cylinders and a crankcase of the natural gas engine results in natural gas in the engine crankcase, which has previously vented to atmosphere. Likewise blow-by between the compression cylinders and a crankcase of the compressor results in natural gas in the compressor crankcase, which has previously vented to atmosphere. The scrubbers and other pneumatic devices (e.g., actuators, valves etc.) typically vent compressed gas, during or after operation, directly to the atmosphere. The present disclosure is directed to an emissions evacuator system 50 that collects natural gas vented from various components of a natural gas package and directs the vented gases to the intake system of the natural gas engine. See FIGS. 4A, 4B and 5. Generally, the evacuator system 50 utilizes vacuum from an intake system of the natural gas engine contained on compressor packages to "suck up" the gaseous emissions from several different sources on the compressor package. Such sources include, without limitation, the engine crankcase, the compressor crankcase, compressor cylinder packing vents, scrubbers, and pneumatic actuators.

All spark-ignited reciprocating engines such as natural gas engine 18 have an inherent low-pressure zone in the air intake system 52 of the engine. The intake system 52 of the engine 18 is where air and fuel are introduced to the engine 18 and ultimately fed into engine cylinders for combustion. The intake system 52 also typically includes an intake air filter 54. The combination of the low-pressure zone (oftentimes referred to as engine vacuum) and the fact that fuel is introduced allow this system 50 to serve as an evacuation system for the emissions described previously. Engine vacuum serves to draw in or "suck up" the gaseous emissions (vented natural gas) from various locations/components on the compressor package or skid 20. Feeding these emissions into the engine combustion cylinder allow for the oxidation of these emissions/volatile organic compounds (VOCs), turning them into inert gases which have a much lower greenhouse gas affect than the VOCs themselves.

Figure 4A:
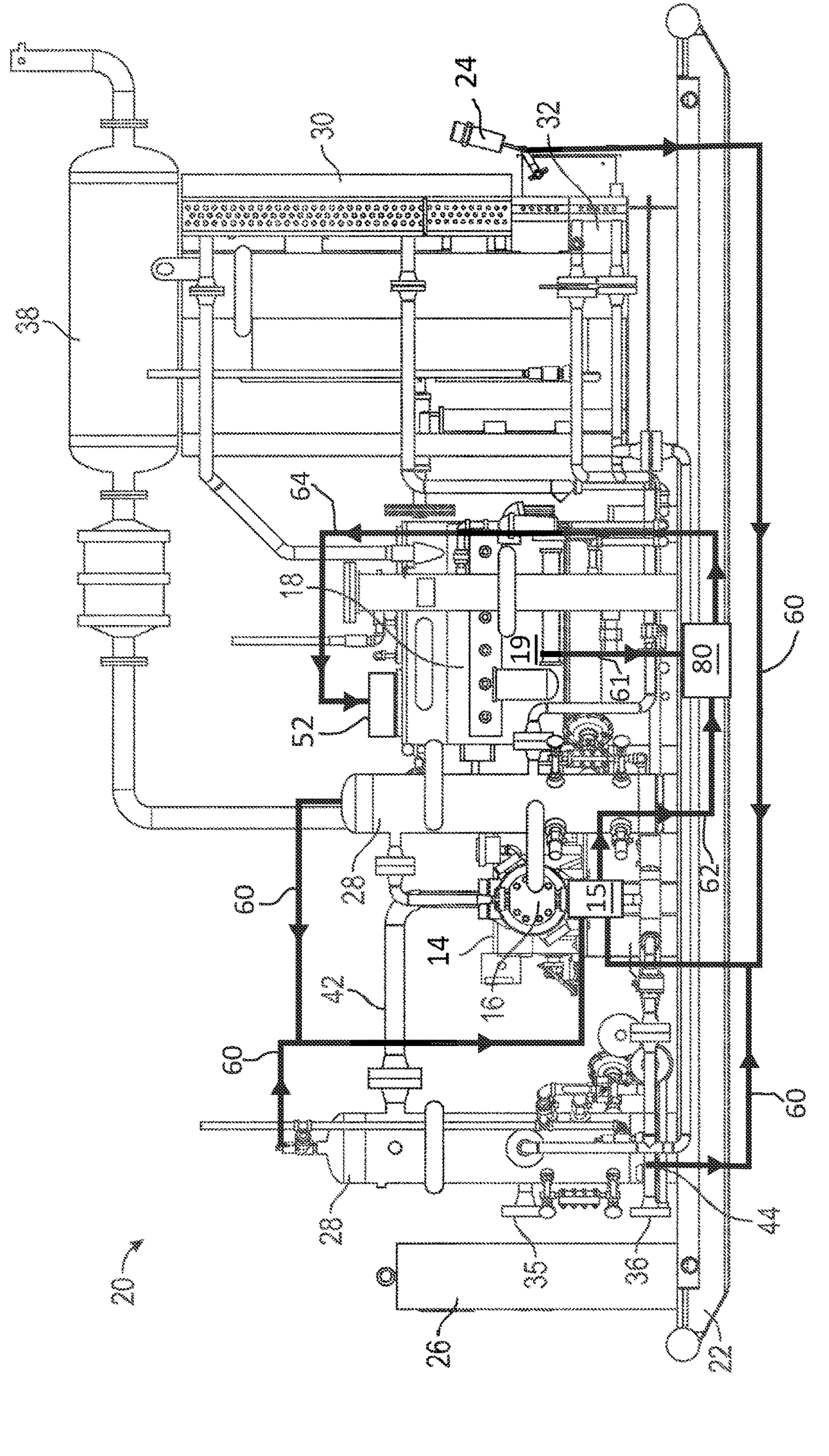
FIG. 4A shows a side elevational view of a compressor skid unit with an emissions evacuator system in one embodiment.
Figure 4B:
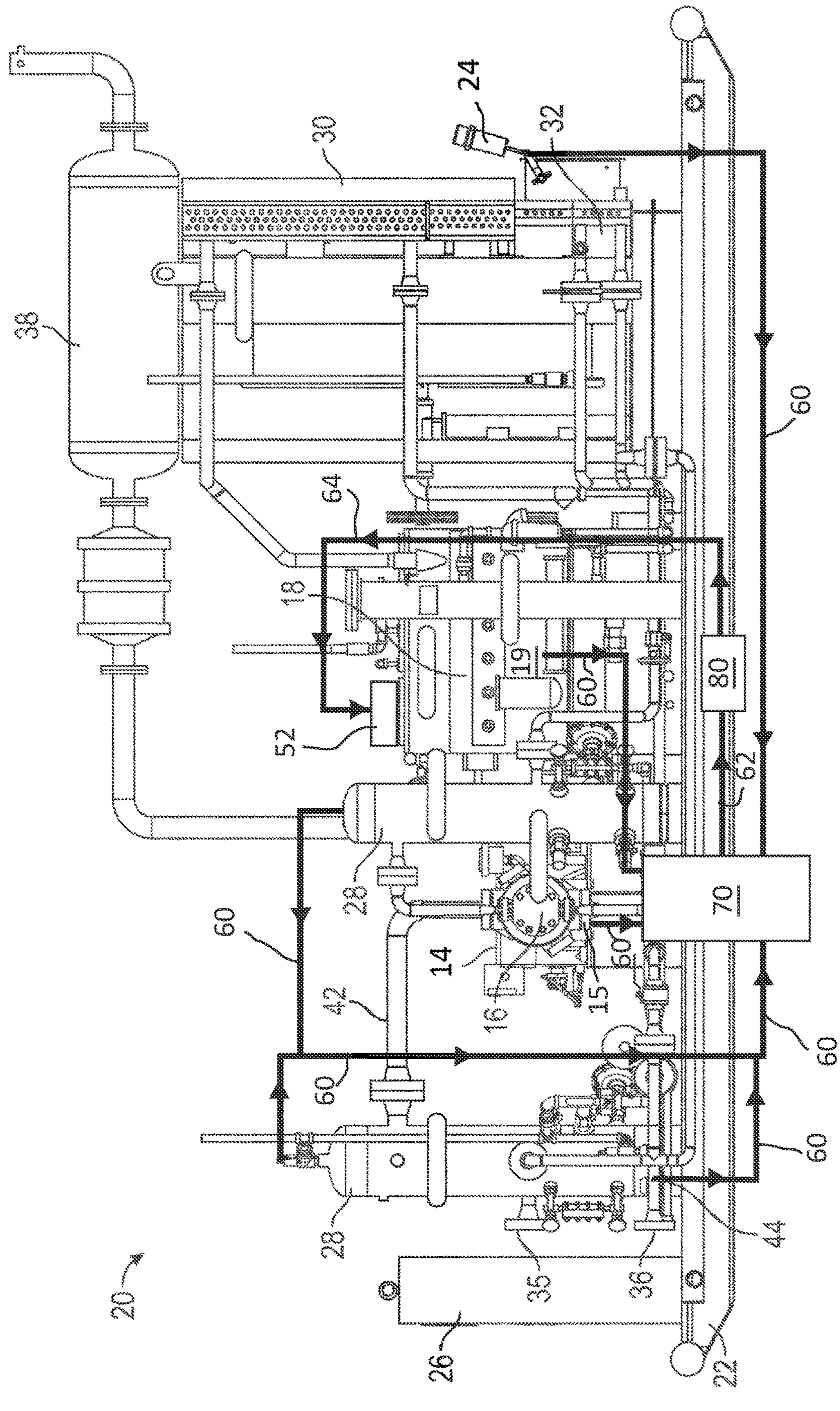
Figure 5:
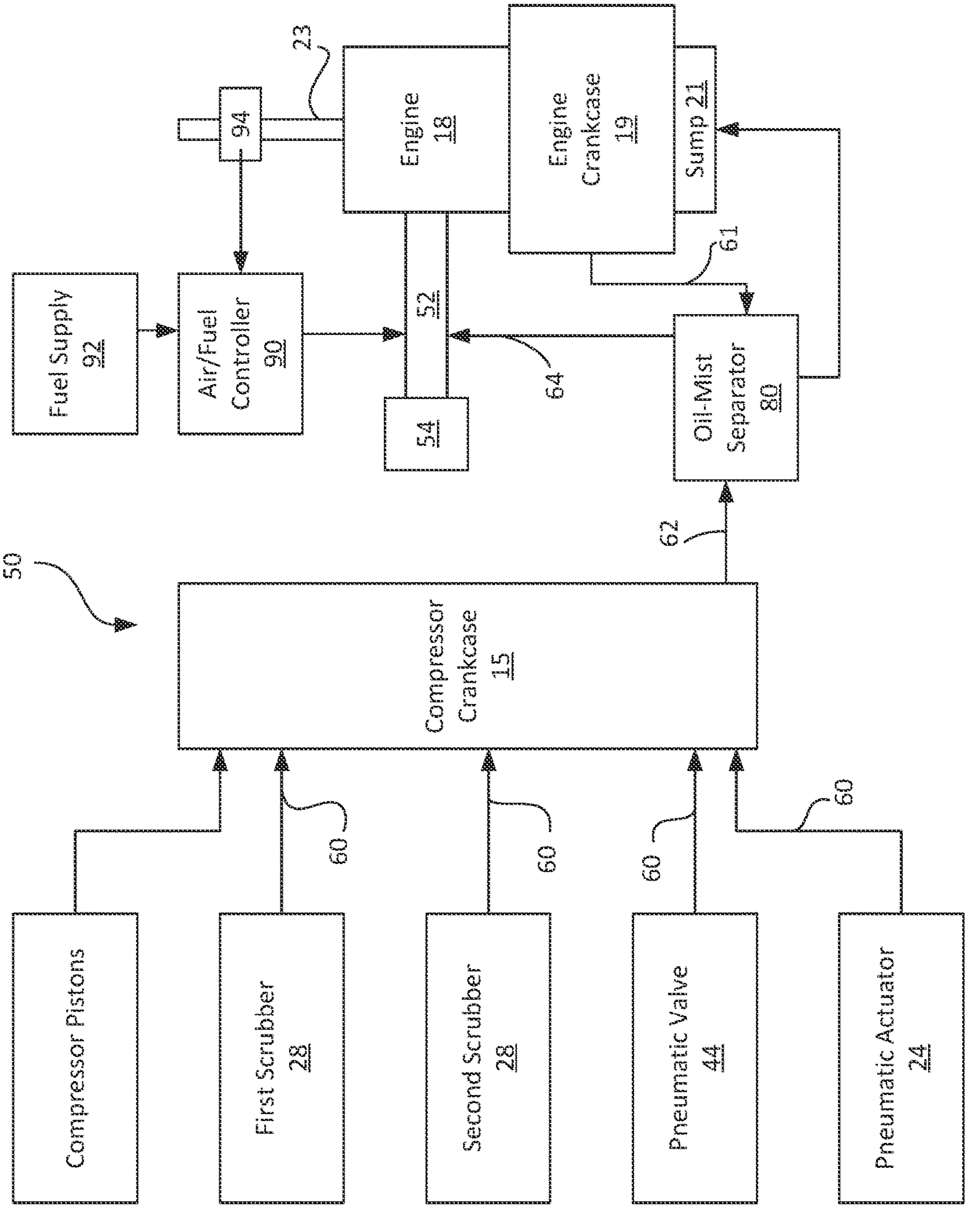
FIG. 5 shows a schematic diagram of a gas compressor package with an emissions evacuator system in an embodiment.

As illustrated in FIGS. 4A, 4B and 5, each of the components that vents gases to the atmosphere (emission sources) may be connected by various conduits, piping, tubing and/or manifolds to the air intake system 52. In this regard, a discharge port or discharge vent of each of emission source/component (e.g., engine crankcase 19, compressor crankcase 15, scrubbers 28, pneumatic valve (s) 44, pneumatic actuator(s) 24 etc.) may be fluidly engaged with a fluid conduit (e.g., collecting conduit 60) that fluidly connects a discharge port/exhaust port of each of these emission sources to the air intake system 52. Vacuum from the air intake system 52 may then continuously draw on each of these emission sources/components and thereby draw gases from each of these components as gas is vented. Accordingly, such vented gases are captured and fed to the engine combustion chambers where they are rendered inert. While simple in theory, implementing such an evacuator system 50 provides a number of challenges. Such challenges include flow variation, condensation of vented gases and/or controlling exhaust emissions.

While the air intake system 52 may provide a near constant level of vacuum to fluidly attached emission sources (e.g., when the engine 18 is operating at steady state), the output flow from the various emission sources fluctuates. For instance, while the engine crankcase 19 and compressor crankcase 15 may have a relatively steady rate of venting (e.g., due to blow-by in the ignition and compression chambers, respectively), emission sources such as the scrubbers 28 operate intermittently. Likewise, the pneumatic valve(s) 44 and pneumatic actuator 24 (e.g., which controls louvers, in an embodiment) operate intermittently. Further, some of these emissions sources can produce relatively large instantaneous or short-duration gas flow rates (i.e., during intermittent operation), which if introduced directly into the engine would cause instability in the combustion process. This instability could have the negative side effect of producing engine exhaust emissions that are out of compliance or worse yet, cause the engine power output to be insufficient for the load and stumble or even die. Thus, a means to smooth out the intermittent nature of some of the emissions sources is required.

One means to smooth out intermittent/irregular flows of vented gases is to introduce the vented gases into an accumulating vessel or tank 70 (e.g., accumulating tank) having a volume that is significantly larger than an expected volume of the intermittently vented gases. This is illustrated in FIG. 4B. As illustrated, each of the emission sources, the scrubbers 28, compressor crankcase 15, engine crankcase 19, pneumatic valve(s) 44 and/or pneumatic actuator(s) 24 are fluidly connected to an interior of the accumulating tank 70 via a series of collecting conduits 60 (e.g., tubing, piping, etc.; not to scale). The arrows within the various illustrated collecting conduits 60 indicate the direction of fluid flow through the conduits. As illustrated various emission sources 24 may be fluidly connected by a dedicated collecting fluid conduit. Additionally, or alternatively, two or more emission sources (e.g., two scrubbers 24) may share at least a portion of a common collecting fluid conduit. The size of such conduits (e.g., interior diameter) may be selected based on the components to which they attach and/or based on an expected flow rate. In any arrangement, vacuum from the air intake system 52 may be applied to or near the exhaust ports or vents of each of the emission sources via one or more collecting conduits 60 extending from the accumulating tank 70, which is connected to the vacuum source (e.g., air intake system 52) via one or more conduits 62, 64 (vacuum conduits). When one of the intermittent emission sources discharges, vented gas are drawn into the tank 70 via one or more collecting conduits 60. In such an arrangement, an instantaneous or short-duration influx of gas (e.g., from a single scrubber 28, multiple scrubbers 28 simultaneously, etc.) disperses within the tank minimally increasing the density of the gases within the large volume tank 70. As the inlet flow expands into the large volume tank(s) 70 (e.g., smoothing volume) the outlet pressure from the accumulating tank may minimally change. In this regard the flow out of the accumulating tank 70 via one or more vacuum conduits 62 and 64 to the air intake system 52 may be smoothed reducing any spiking of vented gases that are introduced into the air intake system 52. Such an arrangement at least partially alleviates concerns of engine instability due to flow variation.

While the system utilizing a dedicated accumulating tank 70 to smooth vented gases is an effective solution, it will be appreciated that on portable compressor packages/skid systems 20 space for additional components is often limited. Along these lines, the present disclosure recognizes that on a natural gas compressor package, two existing enclosed volumes could be used as an accumulator vessel eliminating the need for a dedicated accumulating tank. Rather, the crankcases 15, 19 of the compressor and engine could each be utilized as an accumulator vessel, thus saving fabrication costs and space to install a dedicated accumulating tank.

The use of the compressor crankcase 15 as an accumulating vessel is illustrated in FIGS. 4A and 5. The compressor crankcase 15 is enlarged in FIG. 4A for purposes of illustration. As illustrated, the two scrubbers 28, the valve 44 and pneumatic actuator 24 are each fluidly coupled to an interior of the compressor crankcase 15 via collecting conduits 60. Thus, the compressor crankcase 14 receives vented gases from each of these emission sources 28, 44 and 24. The compressor crankcase 15 also receives blow-by gas from the gas compression pistons of the compressor 14. The compressor crankcase is fluidly connected to the air intake system 52 via first and second vacuum conduits 62 and 64, which in the illustrated embodiment, pass through an oil mist separator 80, as is discussed below. Also in this embodiment, the engine crankcase 19 is in direct fluid communication with the oil mist separator 80 via a dedicated collecting conduit 61, which may be attached to an engine breather vent. That is, the engine crankcase is not in fluid communication with the interior of the compressor crankcase in this arrangement. The illustrated embodiments of FIGS. 4A and 5 show various emission sources as fluidly coupled to the interior of the compressor crankcase 15. In such an embodiment, the compressor crankcase acts as the accumulating tank that smooths instantaneous/short-duration surges of gas that would be problematic to the engine combustion process. It will be noted that additional or fewer emission sources and/or different emission sources may be routed through the crankcase of the compressor, crankcase of the engine and/or a separate accumulating tank and that the illustrated embodiments are presented by way of example and not by way of limitation.

As noted above, condensation of the collected gases may pose a challenge to implementing the system. Along these lines, emissions for both the engine and compressor crankcases 19, 15, while in gas phase, are laden with water and lubricating oil vapors, which readily condense into liquids upon even the slightest cooling. Since the engine and compressor crankcases 19, 15 operate at elevated temperatures, the emissions coming from them are also at elevated temperatures. Thus, cooling of these emissions is inevitable, inevitably creating liquid condensation. Introducing liquids into the engine air intake system 52 is a recipe for engine damage as liquids are incompressible and the very nature of reciprocating engines is a compression process. Thus, liquids must be first removed from the emissions before being introduced into the engine intake system 52.

In order to remove liquids from the emissions prior to introduction into the engine 18, the presented system incorporates an oil-mist separator 80 between the engine intake system 52 and all emission sources. That is, an oil-mist separator 80 is installed upstream of the point where any emissions are introduced into the engine air intake system 52. The oil-mist separator 80 separates oil and water mists and/or condensed liquids from the gaseous emissions and returns the liquids to the engine crankcase sump 21 (see FIG. 5) where they are not harmful to the engine operation. One feature important to such an oil separator for reliable operation is a source of heat such that water vapors do not freeze and oil vapors do not congeal inside of it during low ambient temperatures. Some oil separators utilize a stream of engine oil as such a source of heat. One exemplary embodiment of such an oil separator is the Alfa Laval Defender 500 produced by Alfa Laval Tumba AB located a5t DE-147 80 TUMBA, Sweden. The Defender 500 accomplishes high efficiency separation of liquids by way of centrifugal motion. Internal separation discs/baffles rotate at a high speed, powered by a side stream of engine oil, whose pressure causes a turbine wheel to spin. The engine oil is at elevated temperatures and serves to heat the oil mist separator housing, preventing blockages from frozen water vapors and/or congealed oil. Other separators may be utilized.

As further noted above, introduction of combustibles vented gases into the air intake system 52 can make it difficult to control exhaust emissions. This is especially true of the intermittently introduced gases. In order for an engine to maintain exhaust emissions levels within a desired level (e.g., complying with emission regulations), the air to fuel mixture should be maintained at or near a predetermined ratio. Adding intermittent flows of combustible gas to the intake fuel/air mixture alters the air/fuel ratio and thus the exhaust emissions levels.

To counteract the effect of intermittently introducing combustible gases to the air intake system, the evacuation system 50 utilizes a fuel control system to adjust the air/fuel ratio entering the engine combustion cylinders such that exhaust emissions can remain constant and in compliance. Along these lines, an air/fuel ratio controller 90 is disposed between the conventional fuel supply 92 and the air inlet system 52. See FIG. 5. The air/fuel controller 90 is operatively connected to a sensor 94 disposed within the exhaust 23 of the engine 18. The sensor 94 (e.g., exhaust emissions sensor) continuously monitors exhaust emissions levels and the air/fuel controller 90 continuously adjusts an air/fuel ratio to maintain the exhaust emissions levels in compliance as the air/fuel ratio changes. More specifically, as emissions occur from various emission sources on the compressor package and are admitted to the engine intake system 52, the air/fuel ratio tends to decrease (gets richer). The air/fuel controller 90 compensates for the additional fuel (e.g., adjusts the air/fuel ratio) by decreasing the amount of fuel admitted from the conventional fuel supply 90. In doing so, the air/fuel ratio controller 90 is able to maintain the proper air/fuel ratio entering the engine 18 and thus the engine exhaust emissions remain in compliance in spite of varying changing flow rates of methane emissions being emitted and entering the engine intake system. An air/fuel ratio controller that is capable of making rapid changes to the air/fuel ratio is needed. Such air/fuel controllers are known in the industry and known to those skilled in the art. One exemplary embodiment of such an air/fuel controller is the Engine Integrated Control System manufactured by FW Murphy Production Controls of Tulsa OK.

While the addition of the oil mist separator 80 to the system reduces or eliminates condensed liquids from the gaseous emissions prior to their entry into the engine air intake system 52, condensation can occur in various collecting conduits. For instance, Referring to FIG. 5, the dedicated collecting conduit 61 extending between the engine crankcase 19 and the oil mist separator 80 can experience condensation and/or clogging, especially in cold weather applications. Such condensation or clogging can result from crankcase vapors, which are sometimes referred to as "blow-by". Blow-by is a gaseous mixture of air, fuel, engine exhaust, water and oil. The water and oil vapors sometimes combine to create an emulsion, which can block the engine crankcase breather line and, in the current system, block the collecting conduit 61. That is, oil vapor and water vapor may form a mixed vapor (e.g., emulsive vapor) at elevated temperatures within the crankcase and this emulsive vapor may condense while passing through the collecting conduit 61. Such condensation may result in a gel like substance forming in the collecting conduit 61, which may eventually clog the conduit 61. A similar emulsive vapor may also form in the conduit 62 between the compressor crankcase 15 and the oil mist separator 80. That is, compressor oils and water in the compressor crankcase 15 can also form emulsive vapors that can condense when cooled potentially clogging one or more conduits.

Figure 6:
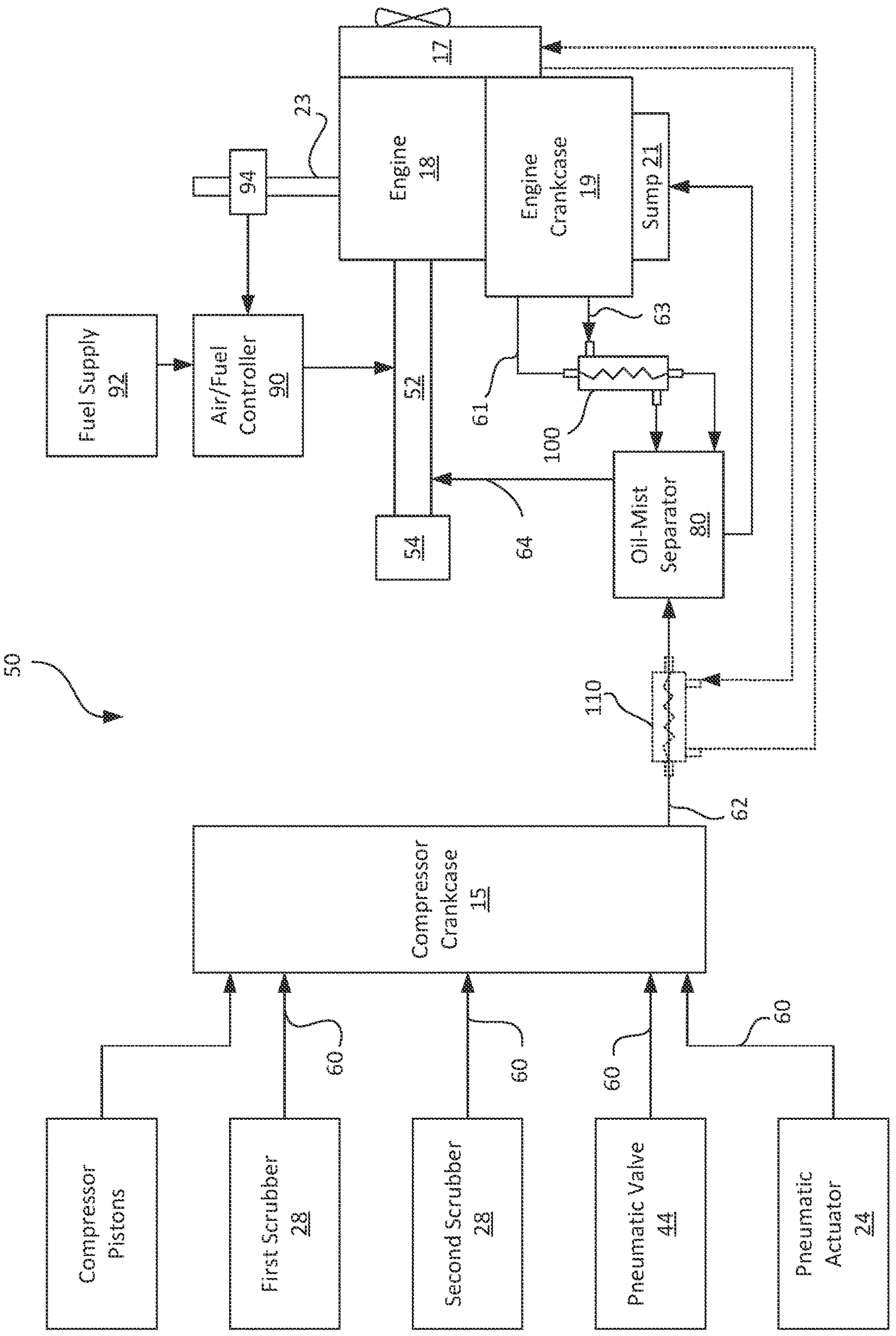
FIG. 6 shows a schematic diagram of a gas compressor package with an emissions evacuator system in another embodiment.

FIG. 6 illustrates an alternate embodiment of the evacuator system 50 of FIG. 5. In this embodiment, a heat exchanger 100 is disposed in the collecting conduit 61 between the engine crankcase 19 and the oil mist separator. In this regard, it has been found that heating an emulsive vapor breaks the emulsive vapor into its constituent components (e.g., oil and water) preventing its condensation. In this regard, heating such an emulsive vapor may prevent clogging in the collecting conduit(s).

In an embodiment, the heat exchanger 100 utilizes engine lubricating oil as a heat source. As will be appreciated, engine oil serves several functions in an engine. First, engine oil lubricates and reduces friction between moving parts. Secondly, oil functions as a heat transfer fluid to remove heat from heat generating portions of the engine. In this regard, engine oil of an operating engine is commonly in the range of 200° F. This heated oil possesses the heat necessary to heat emulsive vapors and break such vapors into their constituent components and thereby preventing condensation and/or clogging in the collection conduit(s). In the illustrated embodiment, the oil mist separator 80 is driven by pressurized oil that is supplied from, for example, an engine oil gallery (e.g., a pressurized oil passage connected to the engine oil pump). In the present embodiment, the pressurized oil is provided through a conduit 63, that exits the engine, passes through a fluid path in the heat exchanger 100 and then passes into the oil mist separator 80. The pressurized oil drives the oil mist separator which separates liquids from the gaseous emissions and returns the diving oil and any separated liquids to the engine crankcase sump 21. The emulsion vapors likewise pass through the heat exchanger 100 on a fluid path that is fluidly isolated from the fluid path of the pressurized oil. The result is the high temperature pressurized oil passing through the heat exchanger 100 heats the emulsive vapors passing through the heat exchanger preventing potential clogging of downstream components.

FIG. 6, also illustrates an optional second heat exchanger 110 disposed in the conduit 62 between the compressor crankcase 15 and the oil mist separator 80. As illustrated, the second heat exchanger 100 may be connected to an alternate heat source. Specifically, this heat exchanger 100 utilizes engine coolant (e.g., antifreeze) from an engine radiator 17 or other engine jacket water passageway as a heat source. As will be appreciated, most internal combustion engines include a series of water passages (e.g., water jacket) through the block of the engine. These water passages carry a heat transfer fluid (i.e., coolant), which is often a glycol and water mixture, to remove excess heat from the engine. The heated fluid then passes through a radiator 17 (e.g., heat exchanger) where it is cooled prior to returning to the engine. The coolant is commonly heated in a range of around 195° F. to 220° F. Accordingly, heated engine coolant like heated engine oil provides an adequate source of heat to break apart and/or prevent condensation of emulsive vapors in the evacuator system 50. As illustrated, vapors from the compressor crankcase 15 pass through a first internal fluid path of the heat exchanger 110 while heated engine coolant passed through a second fluidly isolated path through the heat exchanger 110.

Though illustrated as using a first heat exchanger 100 heated by high temperature engine oil and a second heat exchanger heated by high temperature engine coolant, it will be appreciated that high temperature engine oil could provide the heat source for both heat exchangers. Alternatively, high temperature engine coolant could provide the heat source for both exchangers. Further, while the use of heated engine oil or heated engine coolant provides a passive source (e.g., waste heat) of heat that is readily available on a compressor package, it will be appreciated that other heat sources could be used.

Figure 7A:
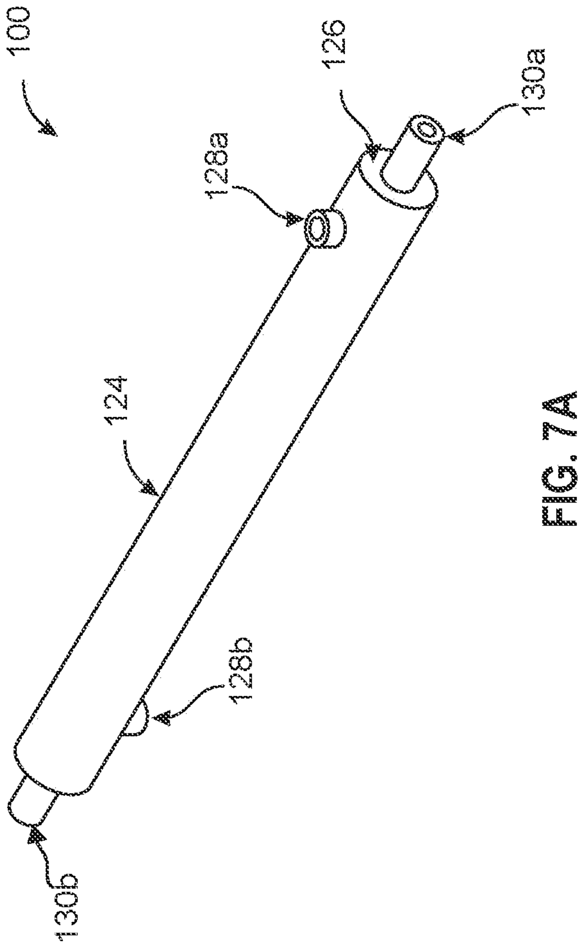
FIG. 7A shows a perspective view of an exemplary heat exchanger, in an embodiment.
Figure 7B:
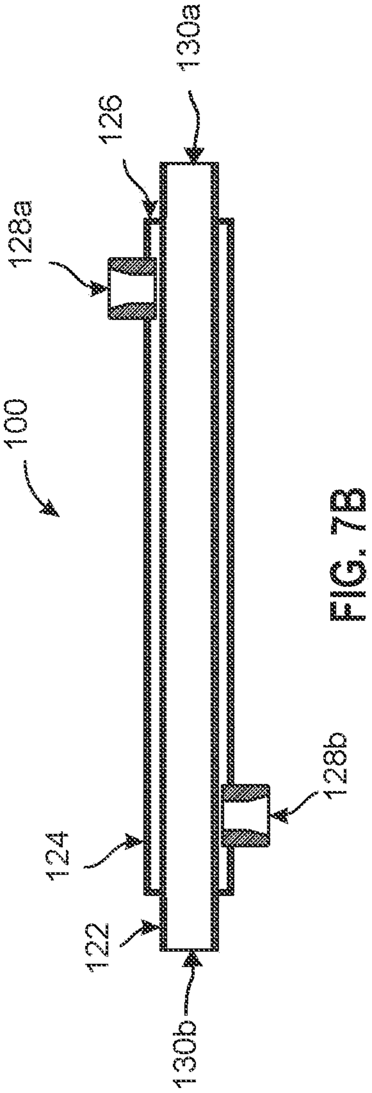
FIG. 7B shows a cross sectional view of the heat exchanger of FIG. 7A, in an embodiment.

FIG. 7A illustrates one non-limiting embodiment of a heat exchanger 100 or 110 (hereafter 100). The heat exchanger 100 includes a heat source inlet **128*a* and a heat source outlet 128*b*. Coolant or oil from the engine 18 flow into inlet 128*a*, through a first channel or internal fluid path of the heat exchanger 100, and out of outlet 128*b* to provide heat to heat exchanger 100. A vapor stream flows into an inlet 130*a* through a second channel or internal fluid path of the heat exchanger 100 absorbs heat provided by the engine coolant/oil and exit through an outlet 130*b*. The heat added to the vapor stream (emulsive vapor) by heat exchanger 100** is sufficient to break the vapor in to its constituent parts and/or avoid generation of condensates.

7B illustrates a cross-sectional view of the heat exchanger 100 of FIG. 7A, according to an embodiment. In this example, the heat exchanger 100 includes two pipes 122 and 124 (see FIG. 7A). The first pipe 122 a fits concentrically within the second pipe 124. An annular space between the pipes 122, 126 is sealed with an annular (i.e., donut-shaped) piece of plate steel 126. The annular space between the pipes 122, 126 forms one of the fluid paths through the heat exchanger 100. The second or outer pipe 124 acts as a shell around the first or inner pipe 122 and may include threaded connections that allow coolant or oil from the engine 18 to be circulated in the annular space between pipes 122, 124. The interior of the inner pipe 122 form another fluid path through the heat exchanger 100. As will be appreciated, the fluid paths are fluidly isolated. The heat exchanger 100 is configured such that as vapors flow through the inner pipe 122, the vapors absorb heat provided by the engine coolant or oil that flows in the annular space between the pipes 122, 124. As illustrated, the heat exchanger of FIG. 7A is a parallel flow heat exchanger. However, it will be appreciated that, in other embodiments, the heat exchanger could be a counter flow heat exchanger or even a crossflow heat exchanger.

Figure 8:
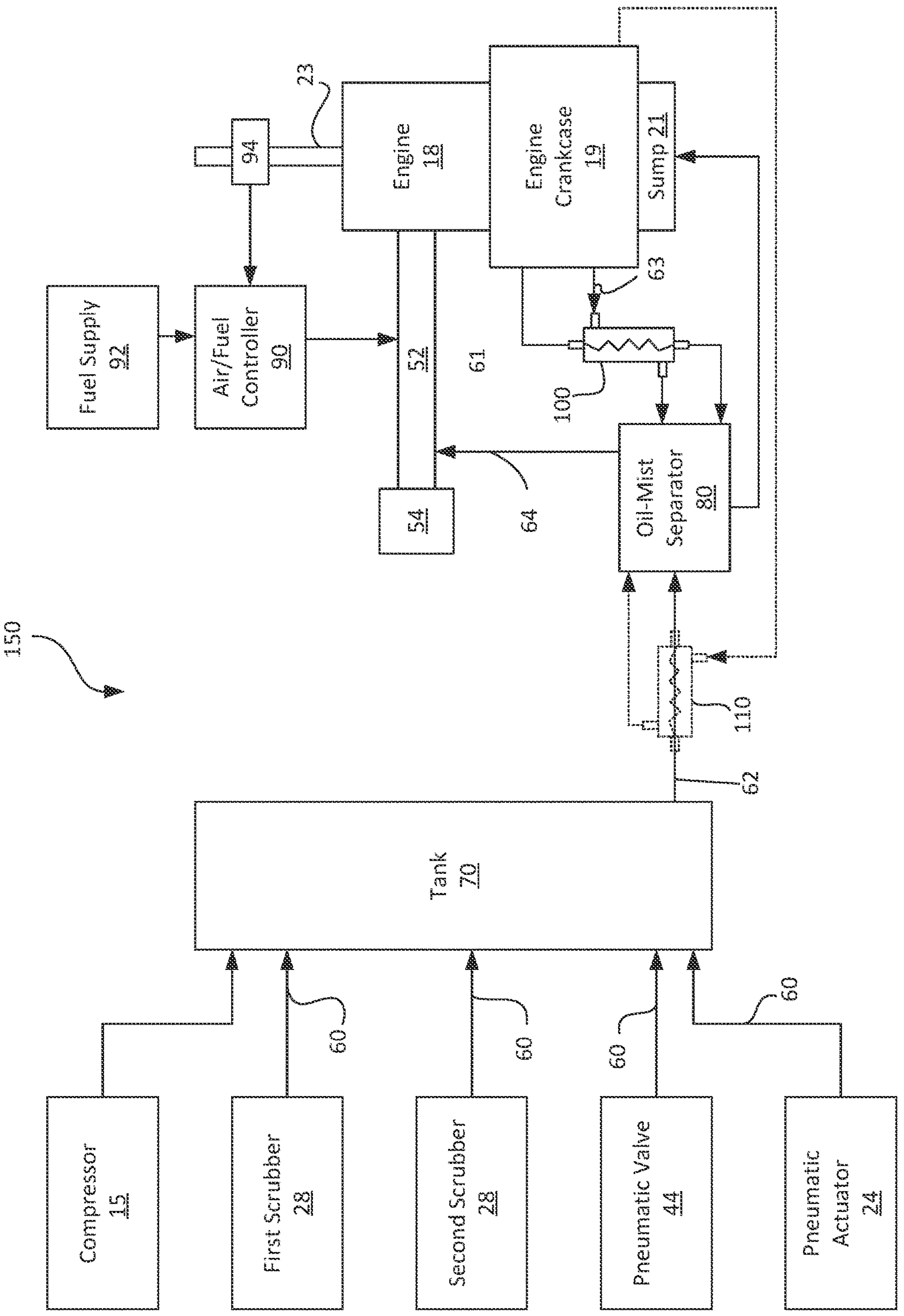
FIG. 8 shows a schematic diagram of a gas compressor package with an emissions evacuator system in a further embodiment.

FIG. 8 illustrates another embodiment of an evacuator system 150. This system is substantially similar to the system of FIG. 6 and common elements include common reference numbers. In the system 150 of FIG. 8, an accumulator tank 70 is used to collect the vapors form the various compressor package components rather than a compressor crankcase. Additionally, the optional second heat exchanger 110 is heated by a stream of heated engine oil.

Figure 9:
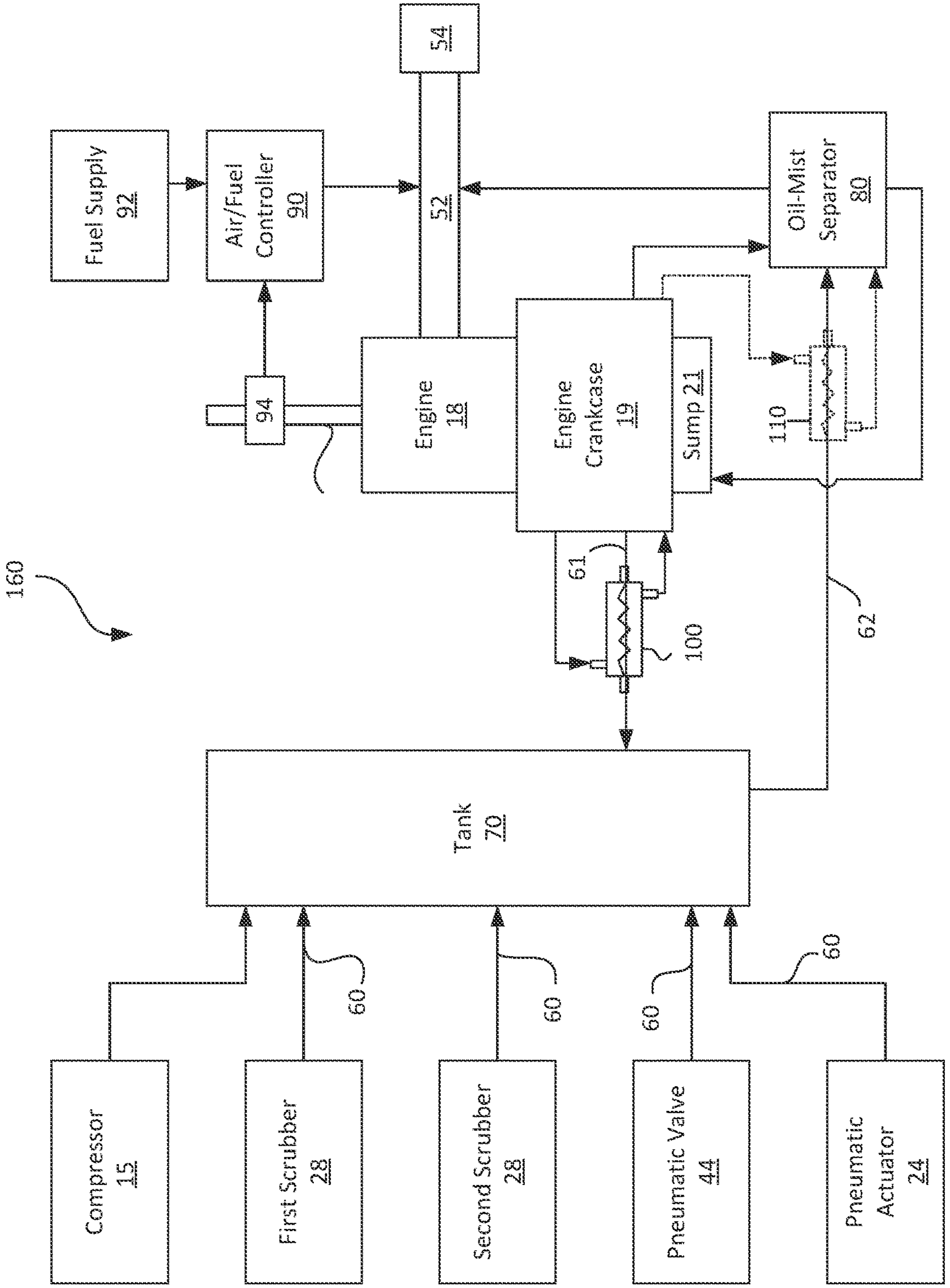
FIG. 9 shows a schematic diagram of a gas compressor package with an emissions evacuator system in a further embodiment.

FIG. 9 illustrates another embodiment of an evacuator system 160. In this system 160, vapors from the crankcase 19 are collected in the accumulator tank 70. A heat exchanger 100 is disposed in the collecting conduit 62 extending between the engine crankcase 19 and the accumulating tank 70. An optional second heat exchanger may be disposed in the conduit 62 extending between the accumulating tank 70 and the oil mist separator. In the illustrated embodiment, both heat exchangers are heated using engine oil. However, this is not a requirement and one or both heat exchangers may be heated utilizing alternate heat sources (e.g., engine coolant, etc.).

Figure 10:
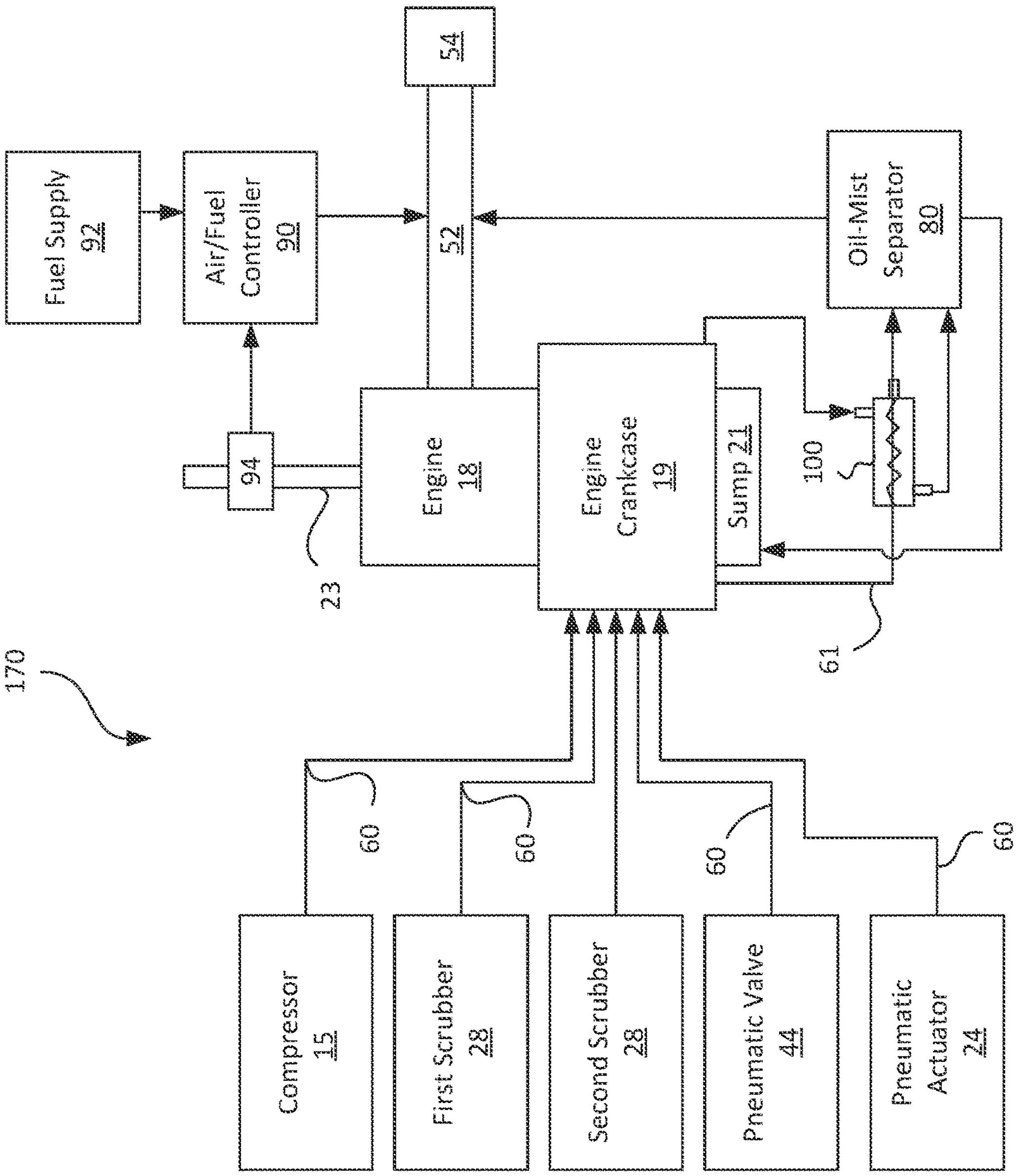
FIG. 10 shows a schematic diagram of a gas compressor package with an emissions evacuator system in yet further embodiment.

FIG. 10 illustrates another embodiment of an evacuator system 170. In the system 170 of FIG. 10, the engine crankcase 19 is the accumulator vessel that collects vapors from the various compressor package components rather than a compressor crankcase or an external tank. A heat exchanger 100 disposed in the engine outlet line 61 between the engine crankcase 19 and the oil mist separator 80. The heat exchanger is heated by a stream of heated engine oil. However, this is not a requirement and the heat exchanger 100 may be heated by an alternate heat sources (e.g., engine coolant, etc.).

Conditional language, such as, among others, “can,” “could,” “might,” or “may,” unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

While embodiments of this disclosure are described with reference to various embodiments, it is noted that such embodiments are illustrative and that the scope of the disclosure is not limited to them. Those of ordinary skill in the art may recognize that many further combinations and permutations of the disclosed features are possible. As such, various modifications may be made to the disclosure without departing from the scope or spirit thereof. In addition, or in the alternative, other embodiments of the disclosure may be apparent from consideration of the specification and annexed drawings, and practice of the disclosure as presented herein. The examples put forward in the specification and annexed drawings are illustrative and not restrictive. Although specific terms are employed herein, they are used in a generic and descriptive sense only and not for purposes of limitation.

What is claimed is:

1. An emission evacuation system for a natural gas compressor package, comprising:

an accumulator vessel;

at least one collecting conduit having:

a first end in fluid communication with an interior of the accumulator vessel; and a second end in fluid communication with a discharge port or discharge vent of at least one emission source of the natural gas compressor package;

at least one vacuum conduit having:

a first end in fluid communication with the interior of the accumulator vessel; and a second end configured to be fluidly coupled to an air intake system of a natural gas engine of the natural gas compressor package, wherein vacuum from the air intake system draws emissions from the at least one emission source into the natural gas engine; and a heat exchanger, wherein a first fluid path through the heat exchanger forms a portion of the at least one vacuum conduit between the accumulator vessel and the air intake system and wherein a second fluid path through the heat exchanger is connected to a stream of heated fluid.

2. The system of claim 1, wherein the accumulator vessel comprises a tank.

3. The system of claim 1, wherein the accumulator vessel comprises a compressor crankcase of a compressor of the natural gas compressor package.

4. The system of claim 1, wherein the accumulator vessel comprises an engine crankcase of the natural gas engine of the natural gas compressor package.

5. The system of claim 1, further comprising:

an oil mist separator fluidly disposed within a flow path of the at least one vacuum conduit between the accumulator vessel and the air intake system.

6. The system of claim 5, wherein the heat exchanger is disposed between the oil mist separator and the accumulator vessel.

7. The system of claim 1, further comprising:

an air-fuel controller, wherein the air-fuel controller is configured to adjust an air fuel ratio of the natural gas engine in response to collected gases drawn into the natural gas engine from the accumulator vessel.

8. The system of claim 7, further comprising:

an exhaust emissions sensor disposed in an exhaust stream of the natural gas engine.

9. The system of claim 1 further comprising:

a plurality of collecting conduits, the plurality of collecting conduits fluidly connecting a plurality of emission sources to the accumulator vessel.

10. The system of claim 8, wherein the plurality of emission sources comprise one or more of:

a crankcase of a compressor of the natural gas compressor package;

a crankcase of the natural gas engine of the natural gas compressor package;

a scrubber of the natural gas compressor package;

a pneumatically operated valve of the natural gas compressor package; and a pneumatically operated actuator of the natural gas compressor package.

11. The system of claim 1, wherein the second fluid path through the heat exchanger is connected to a stream of heated engine oil.

12. The system of claim 1, wherein the second fluid path through the heat exchanger is connected to a stream of heated engine coolant.

13. A system, comprising:

a natural gas compressor;

an internal combustion natural gas engine, wherein the natural gas engine runs the natural gas compressor, the natural gas engine having an air intake system;

at least one collecting conduit connecting an interior of an accumulator vessel with at least one emission source of the natural gas compressor package;

at least one vacuum conduit connecting the interior of the accumulator vessel with the air intake system, wherein vacuum from the air intake system draws emissions collected by the at least one collecting conduit into the natural gas engine; and a heat exchanger, wherein a first fluid path through the heat exchanger forms a portion of the at least one vacuum conduit connecting the accumulator vessel and the air intake system and wherein a second fluid path through the heat exchanger is connected to a stream of heated fluid.

14. The system of claim 13, further comprising:

a second collecting conduit connecting the interior of the accumulator vessel with an interior of a crankcase of the natural gas engine.

15. The system of claim 14, further comprising a second heat exchanger, wherein the second collecting conduit passes through the second heat exchanger.

16. The system of claim 13, wherein the accumulator vessel comprises a crankcase of the natural gas compressor.

17. The system of claim 13, further comprising:

an oil mist separator fluidly disposed within a flow path of the at least one vacuum conduit between the accumulator vessel and the air intake system.

18. The system of claim 17, wherein the heat exchanger is disposed between the oil mist separator and the accumulator vessel.

19. The system of claim 13, wherein the second fluid path through the heat exchanger is connected to a stream of heated engine oil.

20. The system of claim 13, wherein the second fluid path through the heat exchanger is connected to a stream of heated engine coolant.

* * * * *